May 3, 1938. W. STEVENS 2,116,128
FULL VISION OUTDOOR ADVERTISING STRUCTURE
Filed Nov. 2, 1936
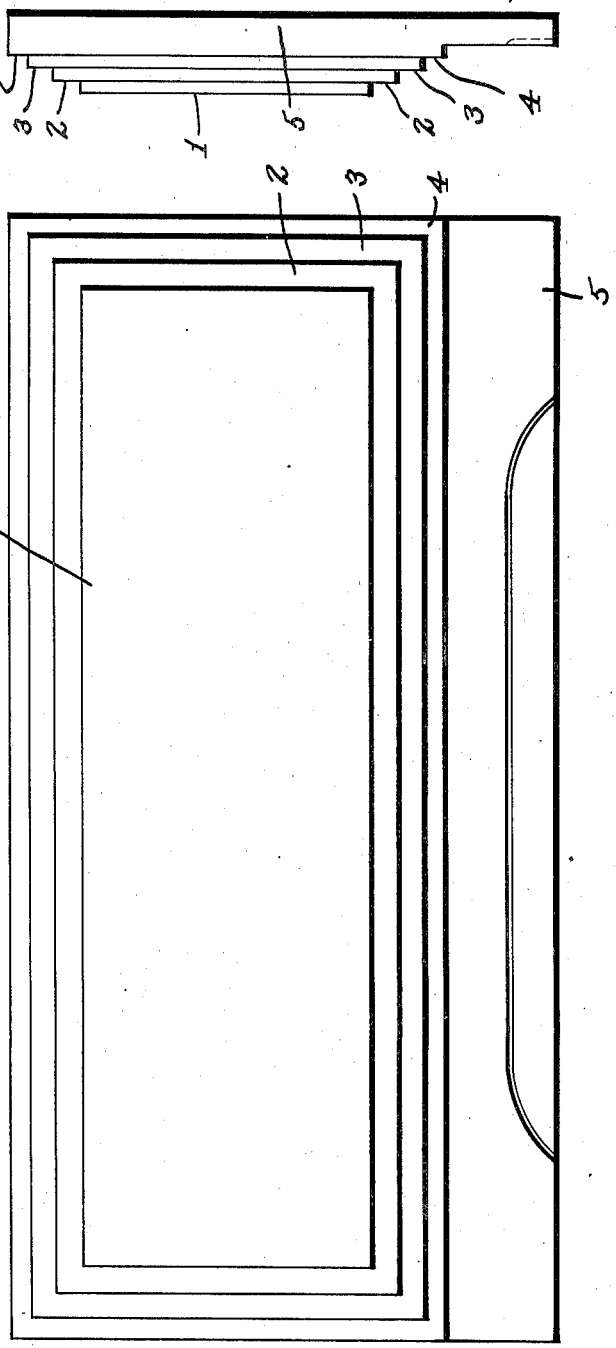
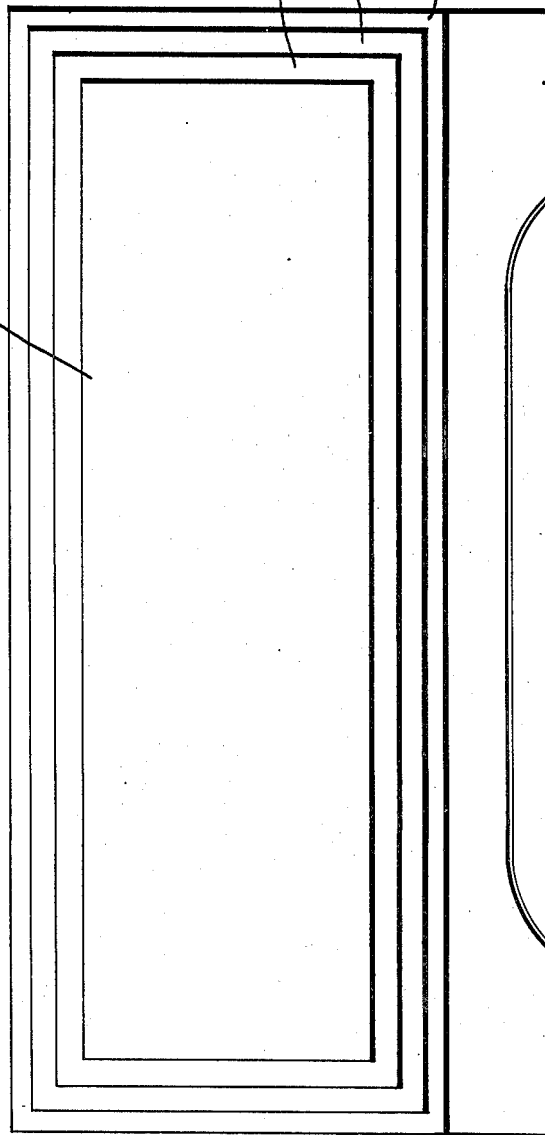
INVENTOR
William Stevens
ATTORNEY
James R. Hodder Patented May 3, 1938

2,116,128

UNITED STATES PATENT OFFICE 2,116,128

FULL VISION OUTDOOR ADVERTISING STRUCTURE

William Stevens, West Roxbury, Mass., assignor to Fullvision Outdoor Advertising Corporation, a corporation of Massachusetts Application November 2, 1936, Serial No. 108,763

1 Claim. (Cl. 40—125)

My present invention is a novel and improved outdoor advertising structure, and is directed to simplify, improve, and perfect such structures, to render the same more attractive, and to insure better visibility and impart a more efficient display surface of modernistic design.

In outdoor advertising and display structures as now universally employed, a relatively large permanent billboard is erected with an overhanging and enveloping type of molding as a frame and finish for the billboard, and as affording a slight wind and weather-protecting feature. Such frame structures are necessarily expensive, being made of molding more or less elaborate, and are highly objectionable in use as constituting a shading frame around the effective area of the billboard contained within so that the advertising matter displayed therein, either painted or posted, must necessarily leave a substantial margin around the advertising matter between the same and the frame structure.

Furthermore, such a frame structure necessarily limited the vision of an observer from either side and also imparted highly objectionable shadows either in sunlight or with artificial lighting.

A still further objection is the marring of the frame by catching paste, paint, etc. particularly on the lower frame structure and sides, as well as constituting a distracting element from the vision of the observer particularly when the observer is passing by quickly, such as by train or automobile.

Also, stains from rain, dust, and the like are collected from the old type projecting frames, which discolor and mar the appearance of the billboard, requiring frequent repainting, etc.

My present invention obviates the difficulties above briefly outlined, and my novel and improved structure provides a simple and efficient billboard much cheaper in construction, eliminating the expensive molding and frame, while presenting the advertising matter displayed thereon, either by poster or by sign painting, in an outstanding manner, closer to the eye of the observer than the old structure, and permitting full vision from any angle.

A most important feature of the present structure is that the advertising matter may have the benefit of the full space of the advertising surface, eliminating the waste of the border heretofore required in outdoor advertising structures as above explained, and therefore presenting the same as a bleed advertisement to the full edge at the top, bottom, and both sides of the structure.

Furthermore, my present method and device eliminates entirely any shadow or reflection from any part of the supporting structure or frame, thus preventing the copy displayed from the danger of distortion, misreading, or alteration of the intended aspect of the display.

Thus, an important feature of my present outdoor advertising structure is to so construct the same that no part thereof will tend to intercept, obstruct, or distort the vision of the observer from either side during relatively fast passing of the observer, and to render the structure more attractive, more "catchy", and with full unobstructed visibility, together with the benefit of larger copy, giving full coverage of same to the advertising space, and with a more attractive complete billboard structure.

I carry out my present invention by forming the billboard surface at an outstanding position toward the observer, such as fronting the road, street, or railroad right-of-way; and set back from this surface a plurality of stepped-back frame borders, which frames may be and preferably are of plain boards, eliminating the expense of molding as used in overhanging frame structures of prior devices. Any suitable number of stepped-back border members can be employed, usually two or three in small signboards, but a larger plurality can of course be utilized, and which may be of any suitable width proportionate to the size of the structure.

A further important advantage and feature of my present structure having the stepped-back frame or border consists in the elimination of the danger of rain-stains on the display surface, as there can be no dripping from the stepped-back feature, as is prevalent in the prior overhanging type, nor is there any collection of dust, dirt, nor streaks or discoloring by rain, ice, or the like at any point on the display surface, the stepped-back feature thus serving to eliminate such prior difficulties and preserving the display surface and its painted or posted signs clean, clear and sharp at all times.

Thus, my improved structure is stainproof and proof against the collection of dust and dirt, as well also as proof against the accumulation of paste on the lower part of the frame—a most objectionable feature of the old projecting frame.

Referring to the drawing illustrating a simple and preferred embodiment of the present invention, Fig. 1 is a plan view of my improved outdoor advertising structure;

Fig. 2 is an end view, and

Fig. 3 is a top view.

It will be appreciated that my invention is equally applicable to any size, style, height, design, or contour for outdoor billboards, and the same may be rectangular, square, round, oval, or otherwise; and the same may be set in combination with grillwork, or the like, in addition to the display surface and set-back border, and in either an elevated position or as a structure from the ground up.

As shown in the drawing, a simple form of rectangular outdoor billboard structure embodying my invention is illustrated. As shown, the same comprises the display area or surface 1 adapted to carry the sign, poster, or advertising matter and to present the message on the same nearest the eye of the beholder, visible from any angle, free of shadows and obstructions, together with a surrounding stepped-back border, herein shown as a plurality, viz. 2, 3, and 4. This border or framelike portion is set back or stepped back from the surface 1, hence accentuating the outstanding appearance of the surface 1 and affording a setting for the same.

These borders or framelike portions 2, 3, or 4 may be of any suitable proportions to correspond to the design and contour of the display surface 1 and may be and preferably are of plain straight boards for economy and effectiveness, although fanciful contours may be utilized, if desired, the important feature being that this border, or plurality of borders, are stepped-back and thus impart the outstanding feature of the display surface 1, as well as the patentable advantages of the stainproof features above herein noted.

The entire signboard may be supported on a suitable base 5, particularly when built from the ground up, although if supported at an elevated surface the base 5 may be omitted, the important feature being the stepped-back structure and the modernistic effect, as well as the advantages of having the display surface outermost and with full vision for the eye of the observer at all points, positions, and angles.

I claim:

An outdoor structure of the kind described adapted to receive successive posters, billboards, paintings, or the like, comprising a projecting display surface constructed and arranged to be nearer the eye of the observer than any other portion of the structure, in combination with a plurality of successive set-back bordering panels completely surrounding the display surface, said set-back panels being positioned and proportioned to prevent shadows on said projecting display surface, the topmost series of set-back panels constituting channels for conducting rain and shielding the same from the projecting display surface, and the bottommost panels being stepped-back sufficiently to prevent catching of any waste, paste, paint, or the like, and prevent stains, whereby the projected display surface is maintained clear, clean, and with full vision to the observer from side angles with natural or artificial lighting.

WILLIAM STEVENS.